Aug. 4, 1964
E. J. HERBENAR ETAL
3,143,361
LEVELING VALVE
Filed Feb. 6, 1958
2 Sheets-Sheet 1
Fig-1
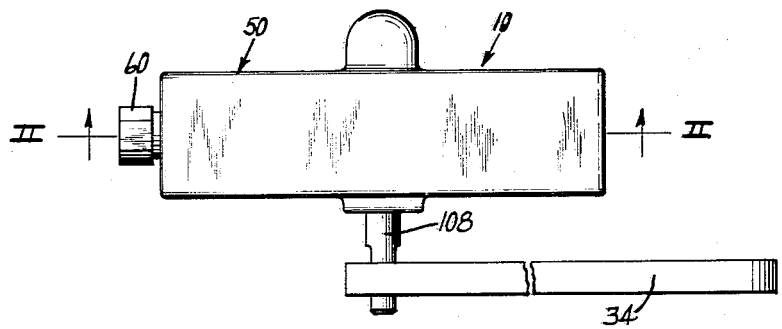
Fig-2
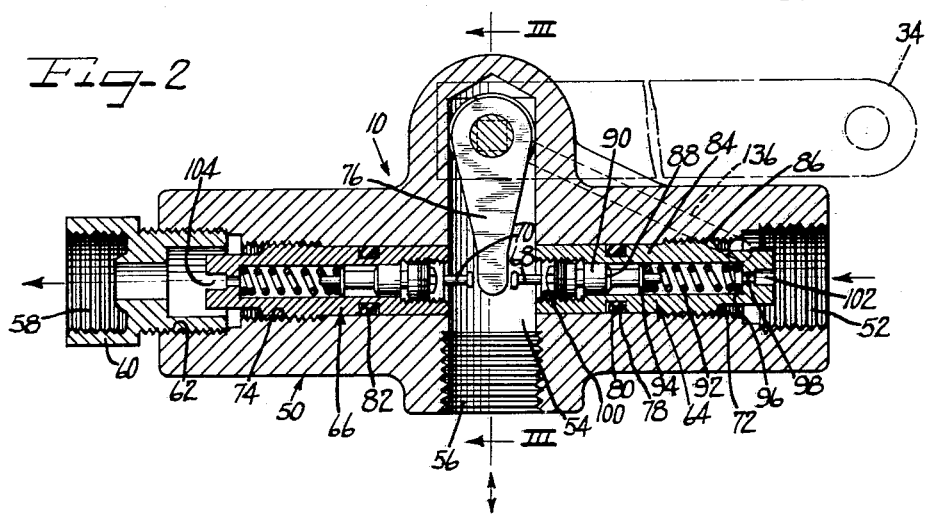
Fig-3
Inventors
Edward J. Herbenar
Robert A. Rasmussen
by Hill, Sherman, Meroni, Gross & Simpson Attys Aug. 4, 1964    E. J. HERBENAR ETAL    3,143,361
LEVELING VALVE
Filed Feb. 6, 1958    2 Sheets-Sheet 2
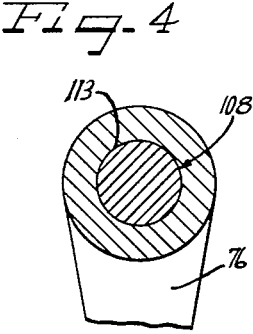
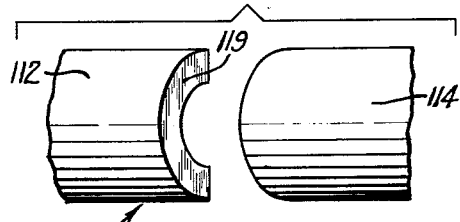
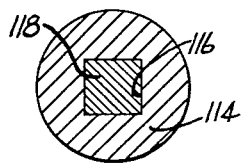
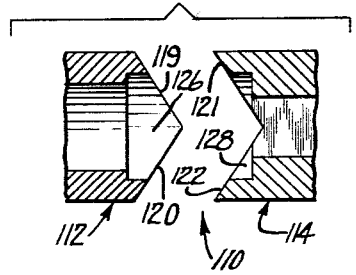
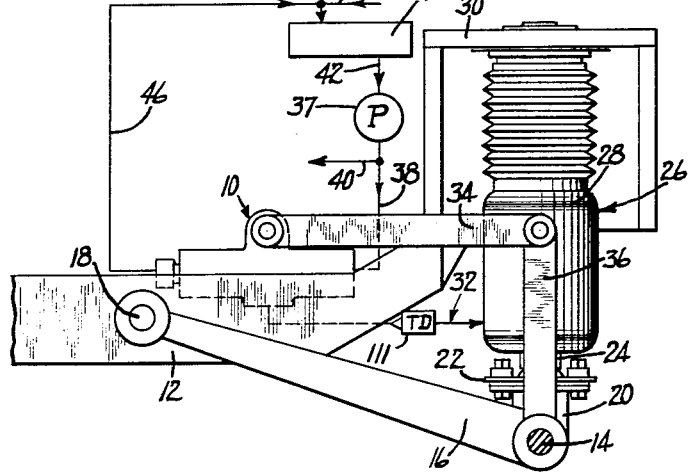
Inventors
Edward J. Herbenar
Robert A. Rasmussen United States Patent Office 3,143,361
Patented Aug. 4, 1964

3,143,361
LEVELING VALVE
Edward J. Herbenar, Detroit, and Robert A. Rasmussen, St. Clair Shores, Mich., assignors to Thompson Ramo Wooldridge Inc., a corporation of Ohio
Filed Feb. 6, 1958, Ser. No. 713,760
2 Claims. (Cl. 280—124)

This invention relates to improvements in a fluid control mechanism for a fluid suspension system of a motor vehicle.

More specifically, the invention relates, as shown in the preferred form in the drawings, to a control valve in combination with an automatic leveling system for a vehicle wherein a leveling device is provided having an expansible chamber positioned between an axle and a frame, and providing a resilient support for the vehicle. A pressurized leveling fluid is supplied to the expansible chamber from a pump, and the flow of fluid is regulated by a control valve. The control valve has a valve body with a first port receiving pressurized fluid from the pump, a second port connected to the expansible chamber for delivering pressurized fluid or bleeding fluid from the chamber to control the level of the vehicle, and a third port leading to a reservoir or sump for supplying the pump. Flow to the second port from the first supply port, or from the second port to the third bleed port, is controlled by valves having bodies adjustably threaded into the first and third ports and having stems projecting into a chamber in the center of the valve body. A pivotally mounted valve-operated arm extends between the valve stems and movement in either direction will open either of the valves to supply or bleed fluid from the leveling chamber. The valve-operating arm is connected to a control arm which extends between the valve and the vehicle axle, so as to move with changes in elevation of the vehicle frame relative to the axle. The control arm is connected to the valve-operating arm through a clutch. The clutch is engaged by a pressurized piston arrangement, which communicates with the first port of the valve so that the clutch will remain engaged while the pump pressurizes the system, but will automatically be disengaged upon failure of pressure so as to prevent bleeding of fluid from the expansible chamber either through the first inlet port or through the third bleed port. The clutch is constructed with tapering self-orienting faces, so that when fluid pressure again builds up, the valve-operating arm will be correctly oriented with respect to the control arm.

Accordingly, an object of the invention is to provide an improved system of the nature described above which is simplified in construction and operation, and is inexpensive to manufacture and assemble.

Another object of the invention is to provide a control valve for a suspension system for a motor vehicle which is of a small size and simple to manufacture and assemble.

Another object of the invention is to provide an improved valve mechanism for a fluid leveling control system which is easily and accurately adjusted, especially for close tolerations in the control of the level of the vehicle.

A further object of the invention is to provide an improved system for controlling the flow of air in a pneumatic suspension equipped motor vehicle wherein air is automatically locked in the system upon failure of the supply of air pressure, thereby preventing the loss of air pressure in the air spring of the system allowing the vehicle to be operated without the leveling feature.

Another object of the invention is to provide an improved valve for a pneumatic suspension system for a motor vehicle which can be used as a lock-out type of valve, or as a constant leveling valve.

A still further object of the invention is to provide an improved valve construction for use in a pneumatic suspension system for a motor vehicle wherein the flow of air to and from the system is controlled, and wherein the control valve automatically remains closed on failure of supply air pressure, and whereupon with replenishment of the air pressure, the control for the valve will automatically reorient itself for accurate leveling operation.

Other objects and advantages will become more apparent with the teaching of the features and principles of the invention in connection with the disclosure of the preferred embodiment thereof in the specification, claims and drawings, in which:

FIGURE 1 is a plan view of a valve assembly embodying the principles of the invention;

FIGURE 2 is a vertical sectional view taken along line II—II of FIGURE 1, with the view being enlarged to show the interior detailed construction;

FIGURE 3 is a vertical sectional view taken along line III—III of FIGURE 2;

FIGURE 4 is an enlarged detailed view taken along line IV—IV of FIGURE 3;

FIGURE 5 is an enlarged detailed view taken along line V—V of FIGURE 3;

FIGURE 6 is an enlarged detailed plan view taken along line VI—VI of FIGURE 3 with parts removed;

FIGURE 7 is an elevational view of the clutch of FIGURE 6; and,

FIGURE 8 is a schematic view illustrating an overall sysem with the pneumatic suspension mechanism for one of the wheels of the vehicle.

As shown in the drawings:

FIGURES 1 through 6 show details of a control valve 10 for the system, and FIGURE 8 shows the control valve in operational relationship to the system. As illustrated in FIGURE 8, a motor vehicle is provided with a frame 12, and with an axle 14 upon which is carried a wheel. The laterally extending axle is supported on a longitudinally extending pivotal rod 16, pivotally tied to the frame 12 at 18, and tied to the axle at the other end. Extending downwardly to carry the axle is a vertical member 20, which is connected to a ball and socket joint 22, which is carried at the lower end of a piston rod 24 or the like, which is part of the pneumatic suspension assembly 26.

The pneumatic suspension assembly 26 may take various forms, as will be recognized by those skilled in the art, and generally will include a housing 28 having an expansible chamber therein. The expansible chamber may be of the nature of a slidable piston located within a cylindrical chamber with the cylindrical chamber being filled with air, or with a fluid exposed to an air chamber so that the frame 12 will be resiliently supported on a wheel mounted on the axle 14.

In automatic leveling systems employing a pneumatic suspension assembly such as shown at 26, leveling of the vehicle is accomplished by supplying a liquid or a gas to the suspension units in controlled varying quantities to compensate for differences in loads on the wheel. In this manner, the frame at the four corners of the vehicle is continually supported at a uniform level above the wheel, so as to always maintain the vehicle in a level condition. It will be understood that the system for only one corner of the vehicle is illustrated in FIGURE 8, and this will be duplicated for each of the corners of the vehicle.

The suspension assembly 26, which may be generally referred to as a pneumatic suspension, is mounted on a fabricated support 30 at the end of the frame 12. Fluid for leveling the vehicle is supplied to the chamber of the suspension member 26 through a conduit 32. The flow through this conduit, to either bleed fluid from the suspension member 26 or supply pressurized fluid to the suspension chamber, is controlled by the valve 10.

The valve 10 is mounted on the frame 12 and the variation in the height of the frame above the axle 14 and wheel is transmitted as a signal to the valve by movement of a control arm 34. The control arm 34 is connected to a link 36 secured to the axle.

Pressurized fluid for the system is supplied by a pump 37 having a delivery conduit 38 leading to the valve 10. The delivery conduit may be provided with branch conduits 40 which supply control valves at the other corners of the frame of the vehicle.

The pump 36 has an intake of fluid through a conduit 42 which connects with a reservoir or sump 44. A return conduit 46 leads from the control valve 10 to supply the sump, and other conduits 48 will lead from the other control valves of the system.

As illustrated in FIGURES 1, 2 and 3, the control valve 10 has a valve housing or body 50. The body is somewhat T-shaped, and is provided with a first or inlet port 52, which is connected to the fluid supply conduit 38 from the pump. This first port 52 leads inwardly into the valve body to open into a central chamber 54 in the valve.

The valve body 50 has a second port 56, which connects to the conduit 32, which leads to the fluid suspension member 26 for the vehicle. Fluid will flow in either direction through port 56, as indicated by the arrows, for either supplying pressurized fluid to the suspension member 26 or permitting fluid to bleed out of the member.

The valve body is provided with a third valve port 58, which connects to the conduit 46 leading back to the fluid sump. In the event the pressurized supply of fluid is air or gas, the port 58 may open to atmosphere while, if the system uses a liquid, a conduit will be used which leads to the supply sump. The port 58 is shown as extending through a fitting 60 which is screwed into the threaded end of an opening 62 in the valve body 50.

The control of the flow of fluid from the first inlet port 52 to the second port 56, which connects to the suspension member, is obtained by a normally closed valve 64. The control of the flow of fluid between the second port 56 and the release or bleed port, which is also referred to as a third port 58, is obtained by a valve 66. The first valve 64 has a valve-operating stem 68 projecting into the chamber 54, and the second valve 66 has a similar valve-operating stem 70 also projecting into the chamber 54 and from the opposite direction. The first port 52 leads into the valve 64 and has internal threads 72 in order that the first valve 64 may be adjustably threaded into the valve body. The third port of the valve carries internal threads 74 so that the second valve 66 may be adjustably threaded into the valve body. Thus, each of the valves 64 and 66, is adjustable with respect to the center chamber 54 of the valve body. This adjustment permits accurate positioning of the valve stems 68 and 70 with respect to a valve-operating arm 76, which is centrally located within the valve chamber 54.

The valve-operating arm 76 is pivotally supported so as to move in either direction against the valve stems 68 and 70 to depress the valve stems and operate either valve. The valve stems are located at each side of the operating arm 76, inasmuch as the valves 64 and 66 are coaxially mounted within the body in opposed relationship.

The valves 64 and 66, although they may be of other construction, are shown as being of the removable core type and are identical in construction, so that only one need be described in detail. The valve 64 has an annular groove 78 at a location intermediate its ends and a sealing O-ring 80 is carried within the groove to seal against the wall of the port leading into the valve. A similar O-ring 82 is provided for the valve 66.

The valve 64 has a tubular shaped body 84 with threads 86 at one end for adjustably mating with the threads 72 in the valve body 50. The valve stem 68 carries at one end a valve head 88, which seats against an annular member 90 carrying a valve seat. The valve head is urged against the seat by a coiled compression spring 92 bearing against a collar 94 on the valve stem and, at its other end bearing against a shoulder 96, formed by a reduced portion 98 of the tubular passageway through the center of the valve body 84. The tubular passageway is threaded at 100, so that the valve core assembly, which includes the head 88 and the seat defining member 90, can be threaded into the valve body 84.

Thus, the valve assembly is carried as an entity within the valve body 84, and the body is formed with a slot 102 at its base to rotationally adjust the position of the valve with respect to the valve operating member 76. The other valve 66 also has a slot 104 for receipt of a screwdriver end to adjust the position of the valve 66 with respect to the valve operating member 76. Adjustment of the position of the valves 64 and 66 will determine the location at which the valves are operated with respect to the movement of a vehicle wheel relative to the frame 12.

For this purpose, the valve-operating arm 76 is pivoted by a control arm 34. The control arm 34 is mounted on a valve-operating shaft 108 which is rotatably mounted in the valve body 50. The control arm 34 connects to the axle of the wheel, as shown in FIGURE 8, so that with relative up-and-down movement of the wheel with respect to the frame, the control arm 34 will be rocked up and down. Movement of the control arm 34 will rock the shaft 108, and the shaft connects to the valve-operating arm 76 through a clutch assembly 110. The clutch is shown in its disengaged position in FIGURE 3. When the clutch is engaged, up-and-down rocking movement of the control arm 34 will pivot the valve-operating arm 76 to open either valve 64 or 66. Since the wheel of the vehicle will bounce up and down during normal travel along a road, a time-delay valve 111 is normally provided in the conduit 32 to prevent the flow of fluid each time the axle 14 moves up and down. Thus, with operation of the valves 64 and 66, only after a time delay, such as occurs when the vehicle is elevated or depressed over a period of time with increase or decrease in load on the vehicle, will a flow of level-correcting fluid be permitted past the time-delay valve 111 through the conduit 32.

The clutch mechanism 110 is provided to permit overtravel of the valve-operating arm 76, such as will occur with excessive movements of the control arm 34, without damage to the valves or other mechanism. The clutch 110 is constructed also to automatically disconnect the valve-operating mechanism in case of failure of fluid pressure in the system. It will be observed that if fluid pressure delivered to the port 52 should fail, and the valve 64 be maintained at an open position, that fluid could bleed from the suspension member 26 back through the pressure system. This is prevented by the clutch safely disengaging to permit closure of the valve 64 in the event of failure of fluid pressure due to breakage of pressure lines or equipment, or due to stoppage of the supply pump 36, such as occurs with shut down of the power system of the automotive vehicle.

It will also be observed that if the power system of the vehicle is shut down when the frame and wheel are positioned so that the relief valve 66 is open, that the fluid could all bleed from the suspension member 26. This is prevented by the valve 10 functioning as a lock-out valve, with the clutch 110 automatically disengaging to permit closing of the valve 66 when the power system is shut down and the pump stops.

As may be observed from the detailed drawing of FIGURE 4, and as also shown in FIGURE 3, the valve-operating arm 76 is mounted for free rotational movement with respect to the shaft 108, being mounted on the cylindrical reduced portion 113 of the shaft. The valve-operating arm 76 carries a clutch part 112. The other clutch part 114 is non-rotatably secured to the control shaft 108. As shown in detail in FIGURE 5, and as also shown in FIGURE 3, the clutch part 114 has a squared axial opening 116, which receives the squared reduced portion 118 of the shaft 108. The clutch part 114 is slidable in an axial direction with respect to the reduced portion 118 of the shaft 108.

As illustrated specifically in FIGURES 6 and 7, and as also shown in FIGURE 3, the clutch part 112 has a tapered upper face 119 and a tapered lower face 120. These tapered faces are received by the mating internal tapered faces 121 and 122 of the clutch part 114.

The clutch parts 112 and 114 are urged to normal disengaged position by a coiled compression spring 124 which surrounds the rectangular reduced portion 118 of the shaft 108, and is located in the recessed portions 126 and 128 of the clutch parts 112 and 114, respectively.

The clutch part 114 is pushed to engaged position with the clutch part 112 by a slidable piston 130. The piston is slidably located in a chamber 132 within the valve housing 50. The piston 130 bears against the end of the clutch part 114 and faces a pressure chamber 134, which is maintained at the pressure of the first inlet port 52 of the valve housing by a conduit 136.

Thus, whenever pressurized fluid flows into the inlet port 52, the chamber 134 is pressurized through conduit 136 to slide the piston 130 to the left, as shown in FIGURE 3, and push the clutch parts into engagement.

In operation of the mechanism, as a load is placed on the vehicle, the frame 12 will sag with respect to the axle 14, and the operating arm 34 will move upwardly. The valve-operating arm 76 will depress the valve stem 68 to permit the flow of pressurized fluid from the port 52 out through the port 56, to be supplied to the suspension member 26. Over-travel of the control arm 34 will not damage the valve or the valve operating arm, inasmuch an excess of pressure on the clutch will cause relative rotation between the clutch parts 112 and 114, and the upper and lower surfaces 119 and 120 of the clutch part 112 will slide with respect to the upper and lower surfaces 121 and 122 of the clutch part 114. When fluid is delivered to the suspension member 26, and the axle 14 is pushed downwardly to correct the leveling of the vehicle, the parts of the valve operating mechanism will automatically reorient themselves. This is accomplished inasmuch as the clutch parts 112 and 114 will automatically return to their oriented position, wherein the part 112 is fully seated in the part 114.

When weight is unloaded from the frame 12 of the vehicle, the control arm 34 will move downwardly pivoting the valve-operating arm 76 to depress the valve stem 70. This will permit fluid to bleed from the suspension member 26. Again, over-travel of the control arm 34 will merely cause relative rotation between the clutch parts. In the event of failure of the pressure supply to the control valve 10, the spring 124 will push the clutch part 114 away from the clutch part 112, so that movement of the control arm 34 will no longer pivot the valve operating arm 76. Thus, the control system will automatically become inoperative upon failure of the fluid pressure, and the suspension member 26 will continue to support the frame of the vehicle at the predetermined correct level. No fluid will be permitted to escape from the suspension member 26 while a supply of fluid under pressure is not available.

Thus, it will be seen that we have provided an improved fluid suspension control system which meets the objectives and advantages hereinbefore set forth. The valve mechanism is small in size and simple in construction to achieve reduced cost. The valve arrangement is such that it is very simple and very accurate. Adjustment can be made for close tolerances of level control of the vehicle frame.

In the event of air pressure failure, the valve automatically locks out, preventing the loss of air pressure in the suspension system or air spring permitting the vehicle to be operated without the use of the leveling feature. The valve also functions as a lock-out valve for retaining constant level after the power system of the mechanism is shut off. The device automatically reorients itself for accurate leveling after fluid pressure is returned. Furthermore, excessive or violent movements of the wheel with respect to the vehicle will not damage the mechanism, and the control valve will always automatically return to its accurate oriented position.

We have, in the drawings and specification, presented a detailed disclosure of the preferred embodiment of our invention, and it is to be understood that we do not intend to limit the invention to the specific form disclosed, but intend to cover all modifications, changes and alternative constructions and methods falling within the scope of the principles taught by our invention.

We claim as our invention:

1. A fluid leveling system for a vehicle comprising in combination a vehicle frame member, a vehicle axle member, an expansible chamber member connected between said frame member and said axle member for resiliently supporting the axle member on the frame and controlling the level of the frame member with respect to a wheel supported on the axle member, a fluid pressure pump adapted to deliver pressurized leveling fluid to the system, a reservoir for supplying fluid to said pump, a control valve located between the pump and the expansible chamber member and having a valve body with a central valve chamber therein with a first port leading into said chamber and connected to receive pressurized fluid from the pump, a second port leading into said chamber and connected to said expansible chamber, and a third port leading from said chamber and connected to conduct a bleeding leveling fluid to said reservoir, a first valve member adjustably threaded into said first port and having a valve operating stem projecting into said valve chamber, a second valve member adjustably threaded into said third port and having a valve operating stem extending into said chamber, a valve-operating arm extending into the valve chamber and located between said valve operating stems whereby movement in a first direction will engage the stem of the first valve member and movement in a second direction will engage the stem of the second valve member, a control arm connected between the frame member and axle member and movable responsive to variations in relative location between the frame member and axle member, a clutch means located between the control arm and the valve-operating arm to connect said arms and cause operation of the valve members with relative movement of the axle member beyond predetermined limits, a pressure-responsive clutch operating member connected to the first port and operative to connect the clutch only when the first port is pressurized by the pump, means to automatically disconnect the clutch with failure of pressure, and means to automatically reorient the clutch with the build-up of pressure at said first port whereby the arms will function to open the valve members at the proper relative positions of the axle and frame with repressurization of the first port by the pump.

2. A control valve mechanism for a leveling system for a vehicle or the like comprising in combination a T-shaped valve body having a first port extending axially into the body and adapted to connect to a source of pressurized fluid, a second port extending into the body and adapted to connect to a leveling device, and a third port extending into the body coaxial with said first port, a first valve adjustably threaded into said first port and having a valve operating stem projecting inwardly to a valve body chamber located at the intersection of said ports, a second valve body adjustably threaded into said third port and having a port operating stem extending into said chamber in the valve body, a pivotal valve operating arm extending between said valve operating stems, a pivotal shaft supporting the valve operating arm, a clutch member having one face on said valve operating arm and another clutch face on said shaft, spring means urging said clutch faces to disengaged position, means on said clutch faces for orienting said faces rotationally when they are moved to engagement, a clutch-operating chamber communicating with the first port of the valve body and having a piston slidable therein connecting to move said clutch faces to engagement with pressurization of the chamber, and a shaft-operating arm adapted to be responsive to changes in position of a vehicle wheel relative to a vehicle frame whereby pressurized operating fluid will be supplied to or bled from a leveling system by operation of said first and second valves and whereby said valves will not be operative with failure of the pressure of a supply fluid.

References Cited in the file of this patent
UNITED STATES PATENTS

| | | |
|---|---|---|
| 1,371,648 | Schmidt | Mar. 15, 1921 |
| 1,565,754 | Orth | Dec. 15, 1925 |
| 1,585,833 | Down | May 25, 1926 |
| 2,670,201 | Rossman | Feb. 23, 1954 |
| 2,820,647 | Jackson | Jan. 21, 1958 |
| 2,841,178 | Schultz | July 1, 1958 |
| 2,844,384 | Jackson | July 22, 1958 |
| 2,923,557 | Schilling | Feb. 2, 1960 |
| 3,099,461 | Stelzer | July 30, 1963 |